G. S. WHITE.
AUTOMOBILE LOCK.
APPLICATION FILED JUNE 26, 1920.

1,387,335.

Patented Aug. 9, 1921.

G. S. White
INVENTOR

BY Victor J. Evans
ATTORNEY

UNITED STATES PATENT OFFICE.

GEORGE SHARPE WHITE, OF NASHVILLE, TENNESSEE.

AUTOMOBILE-LOCK.

1,387,335.  Specification of Letters Patent.  Patented Aug. 9, 1921.

Application filed June 26, 1920. Serial No. 392,067.

*To all whom it may concern:*

Be it known that I, GEORGE S. WHITE, a citizen of the United States, residing at Nashville, in the county of Davidson and State of Tennessee, have invented new and useful Improvements in Automobile-Locks, of which the following is a specification.

This invention relates to theft preventing devices for safeguarding automobiles and has for its object the provision of a locking device associated with the hub of a wheel whereby the wheel may be locked with respect to the stationary brake element associated therewith so as to prevent rotation of the wheel until the lock is released by the proper authorized person.

An important object is the provision of a device of this character which will be very simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
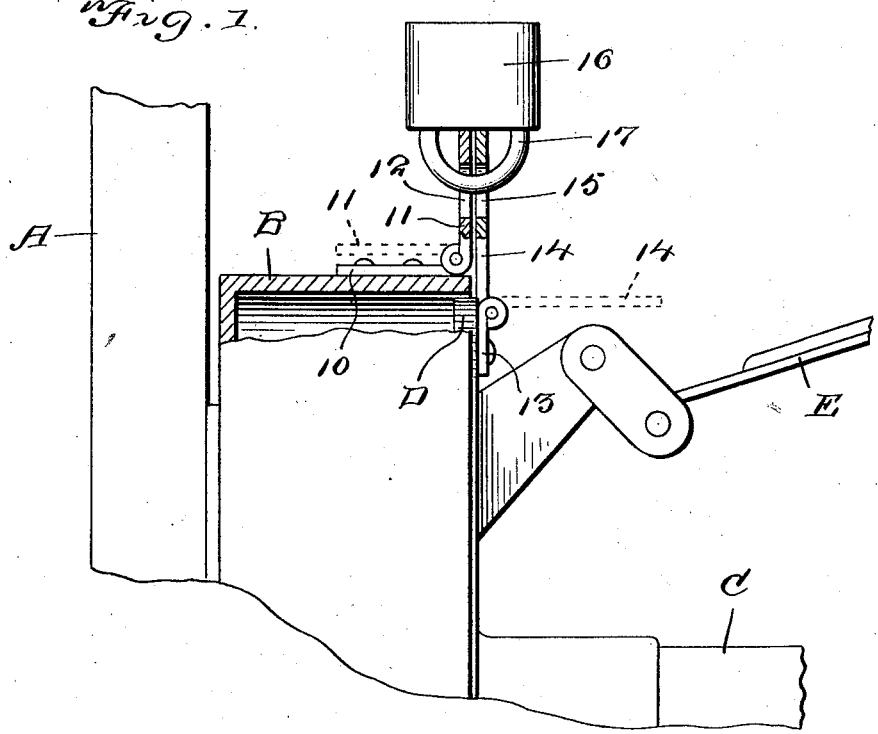
Figure 2:
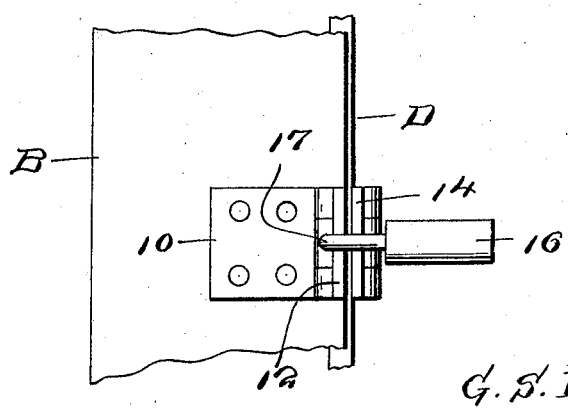

Figure 1 is a cross sectional view through the rear wheel, hub, and associated parts of an automobile and showing my lock in locked position, and Fig. 2 is a cross sectional view through the wheel showing the locking device in plan.

Referring more particularly to the drawings, the letter A designates a rear wheel of an automobile, B designates the brake drum carried thereby, and C designates the axle. D designates the stationary brake band supporting element, and E designates a portion of the spring.

In carrying out my invention I provide a locking device which includes a pair of hinge members, one of which includes a leaf 10 secured upon the brake drum B and which also includes a leaf 11 formed with a slot 12. The other hinge member includes a leaf 13 secured upon the support D and further includes a leaf 14 which hangs loose and which is provided with an opening 15.

Under ordinary conditions, that is when the locking device is not in operation, the hinge members have no connection whatever with each other. However, when it is desired to lock the automobile so that its use is prevented, it is merely necessary that the operator bring the leaves 11 and 14 together whereupon the openings 12 and 15 will register. A suitable padlock 16 then has its shackle 17 inserted through these registering holes. When the padlock is in position it will be seen that use of the automobile is prevented.

From the foregoing description and a study of the drawings it will be apparent that I have thus provided an extremely simple and inexpensive and yet highly efficient device for locking an automobile so that it cannot be stolen.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A locking device for motor vehicles comprising the combination with a fixed element of the rear construction and one of the rear brake drums, of a pivoted leaf carried by said stationary element, and a pivoted leaf carried by the brake drum, said leaves being capable of being brought together and being formed with openings adapted for registration and through which the shackle of a padlock may be passed.

2. An automobile lock comprising a hinge member secured upon the brake drum and provided in one leaf with an opening, and a second hinge member secured upon the stationary element of the rear construction of the vehicle and having one leaf provided with an opening adapted to register with the opening in the leaf of the first mentioned hinge member, and a padlock having its shackle engaged through said registering openings.

In testimony whereof I affix my signature.

GEORGE SHARPE WHITE.